United States Patent [19]
Arai

[11] 3,943,534
[45] Mar. 9, 1976

[54] SAFETY MECHANISM IN MOTOR DRIVEN CAMERA FILM TAKE-UP

[75] Inventor: Akihiro Arai, Tokyo, Japan

[73] Assignee: Asahi Kogaku Kogyo Kabushiki Kaisha, Tokyo, Japan

[22] Filed: July 17, 1973

[21] Appl. No.: 380,048

[30] Foreign Application Priority Data
July 27, 1972 Japan.............................. 47-74609

[52] U.S. Cl................................ 354/173; 354/204
[51] Int. Cl.²............................................ G03B 17/42
[58] Field of Search ........ 95/31; 354/204, 213, 205, 354/206, 212, 214, 173

[56] References Cited
UNITED STATES PATENTS

| | | | |
|---|---|---|---|
| 3,598,034 | 8/1971 | Suzuki .............................. | 354/213 |
| 3,656,420 | 4/1972 | Aizawa et al. ...................... | 354/173 |

Primary Examiner—Joseph W. Hartary
Attorney, Agent, or Firm—Wolder & Gross

[57] ABSTRACT

In a camera including an electric motor for advancing the film an increment frame and for cocking and releasing the shutter an interlock mechanism is provided for preventing further motor actuation in the absence of a full frame advance. The interlock mechanism includes a pair of elements for sequentially sensing successively spaced points in the film advancing cycle and for enabling a normally disabled motor energizing network upon the successive actuation of the sensing elements. The sensing elements may be switches actuated by a cam carried by the film take-up shaft and the network, in one form, includes a pair of relays energized by the closure of respective sensing switches, each relay including a hold switch and a controlled switch, the controlled switches being series connected in a motor energizing circuit. In the mechanical counterpart the sensing elements are pawls actuated by the cam, the successive actuation of the pawls releasing an actuating member for closing a switch in series in the motor energizing circuit. Other networks and mechanisms are described.

8 Claims, 6 Drawing Figures

SAFETY MECHANISM IN MOTOR DRIVEN CAMERA FILM TAKE-UP

BACKGROUND OF THE INVENTION

The present invention relates generally to improvements in cameras and it relates more particularly to an improved mechanism for automatically deactuating an electric motor driven film advance upon reaching the end of the film.

It is well known that in an electric motor driven film take-up mechanism, first a predetermined number of film frames is indexed in a frame number dial, and when the number of exposed film frames reaches the set value, the current supply circuit to the motor is opened to effect an automatic stop. When the number of frames is smaller than the value set in the frame number dial, the stop is not effected until the set value is reached through the performance of a series of actions or of partly omitted actions. Therefore, it is desirable to perform an automatic stop consequent to some change in operation, such as the halting of the take-up shaft owing to exhaustion of the film so as to protect the camera, the take-up mechanism and the film.

There are generally two types of automatic film take-up means; one in which the coupling section to the camera rotates by a predetermined angle for an increment film take-up action and the take-up action is then stopped, and the other in which a slip coupling is provided in the transmission system between the take-up shaft and the drive motor and take-up action is carried out until the take-up shaft is stopped.

Generally, film take-up and make-ready action consists of the following actions: (i) film take-up action (ii) make-release-ready and release action (iii) release retention and return action (iv) idle rotation action for making ready for take-up action. It is well known that in the aforementioned slip coupling type, when the film is exhaused the (i) film take-up action is omitted and the action (ii) – (iv) are repeated, and that in this case the film is forced to stop so that an undesirable influence is exerted on the camera mechanism with its consequent drawbacks and disadvantages.

SUMMARY OF THE INVENTION

It is a principal object of the present invention to provide an improved camera film advancing mechanism.

Another object of the present invention is to provide an improved camera electric motor driven film advancing mechanism.

Still another object of the present invention is to provide an improved mechanism for automatically disabling the motor drive network in a driven film advancing mechanism upon the depletion of the film.

A further object of the present invention is to provide an improved mechanism of the above nature characterized by its reliability, ruggedness, simplicity and great versatility and adaptability.

The above and other objects of the present invention will become apparent from a reading of the following description taken in conjunction with the accompanying drawings which illustrate preferred embodiments thereof.

In a sense, the present invention contemplates the provision of a camera including take-up means for advancing film, a source of current and an electric motor for driving the take-up means, sensing means responsive to the movement of the film take-up means to a pair of successive points, and a normally control network connecting the motor to the current source and being closeable in response to the sensing means responding to the sequential movement of the take-up means to the successive pair of points.

In one form of the improved mechanism a switch actuating member is rotatable with the film take-up drive shaft and the sensing means includes a pair of normally open switches located in the path of the actuating member so as to sequentially close with the film take-up advance. The control network includes one or more relays having normally open hold contacts and control switch contacts which are connected between the motor and current source so that the sequential closing of the sensing switches closes and maintains the relay switches in their closed condition to permit the energization of the motor through the control network. In an alternate form the control network includes a normally open switch between the motor and the current source and an actuator member spring biased to urge the switch to a closed condition. The sensing means includes a pair of pawls releasably locking the actuating member in a retracted position, the sequential actuation of the pawls releasing the actuator member. A cam mounted in the take-up reel drive shaft successively actuates the pawls with the advance of the take-up means.

The improved mechanism positively and reliably assures the deenergization of the film take-up electric drive motor consequent to the depletion or exhaustion of the film.

DESCRIPTION OF THE PREFERRED EMBODIMENTS

Figure 1:
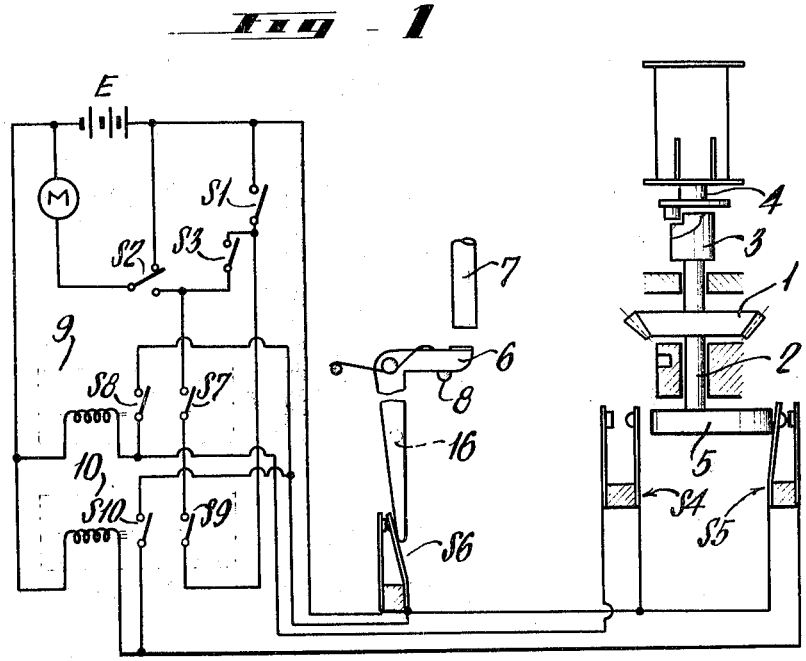
FIG. 1 is an elevational view of the mechanical components and a schematic view of the electrical network of a preferred embodiment of the present invention.

Referring now to the drawings which illustrate preferred embodiments of the present invention, it should be noted that the transmission system between the electric drive motor and the film take-up shaft and the release mechanism aree of well known construction and relationship, as are other components in cameras of the present nature and are accordingly not illustrated.

Figure 3:
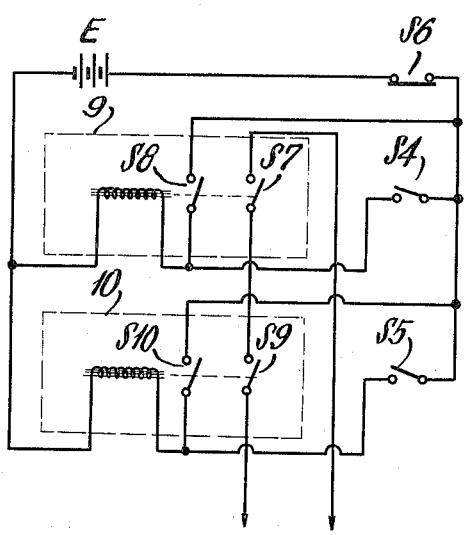
FIG. 3 is a schematic view of the control network of the mechanism shown in FIG. 1.

In FIGS. 1 and 3 there is illustrated a preferred embodiment of the invention which is primarily electrical in nature and in which a gear 1 is fixed to a shaft 2, and driving power from a motor M is transmitted through a known transmission system (not shown). The opposite end portions of the shaft 2 are provided with an eccentric cam 5 and a coupling 3 to the film take-up shaft 4 of the camera. An angular level 6 which is pivoted at its knee to a stationary point on the camera casing is spring urged in clockwise direction. One end of the lever 6 is positioned adjacent to the lower end of the shutter release pin 7 of the camera, while the other end is positioned adjacent to a normally open reset switch S6 to be described later. The range of swing of the lever 6 is restricted by an abutment pin 8. A coupling pin 16 is provided for transmitting release action from a well-known release mechanism (not shown) to the lever 6. Relays 9 and 10 are provided, each having two normally-open type solenoid actuated switches S7 and S8, and S9 and S10, respectively. Energization of a relay solenoid causes the respective two switches to be simultaneously closed. One relay circuit is constituted by reset switch S6, a current source E, the solenoid of relay 9 and a take-up normally-open sensing or detection switch S4 positioned adjacent to the eccentric cam 5, while another circuit which is parallel with the last circuit is constituted by the solenoid of relay 10, another normally-open sensing or take-up detection switch S5 and the reset switch S6 and the current source E which are common to these two circuits. The switches S8 and S10 are for holding or self-retention of respective relays 9 and 10 and are connected in parallel with sensing switches S4 and S5, respectively.

Between a terminal of the current source E and a terminal of the motor M there are provided in series an actuating switch S1, a change-over switch S2 and automatic stop or control relay switches S7 and S9, and an automatic stop release switch S3 is connected in parallel with the series connected automatic stop switches S7 and S9. Thus there are provided an automatic current supply circuit, that is, a circuit for film take-up action, and a manual current supply circuit, that is, a circuit for effecting the release action.

In operation when the switch S2 is so closed as to establish or close an automatic current supply circuit (film take-up action circuit) constituted by the current source E, the changeover switcch S2, the motor M, the motor M is actuated so that power is transmitted through a necessary transmission system (not shown) to the gear 1 so that the shaft 2 is rotated to carry out film take-up action. At the same time, the eccentric cam 5 is rotated and the take-up detection switches S4 and S5 are sequentially momentarily closed, each once for one take-up action. Thus, the relays 9 and 10 operate and the self-retention switches S8 and S10 are closed, so that even if the take-up detection switches S4 and S5 are opened, current supply to the relays is continued, and the automatic stop switches S7 and S9 remain closed. The take-up detection switches S4 and S5 are positioned at a suitable interval so that they are not closed simultaneously.

When this film take-up action is completed, the changeover of the switch S2 is carried out through the action of any suitable or known coupling mechanism (not shown) so that the motor M is stopped. Then, when the actuating switch S1 is closed, there is established a closed manual current supply circuit constituted by the current source E, the actuating switch S1, the relay switches S9 and S7, the change-over switch S2 and the motor M, so that the motor M is again energized and actuated.

At the same time, through the action of a mechanism which is not shown, the release action coupling pin 16 is pushed to the right without rotating the shaft 2 so that the release lever 6 is swung in counterclockwise direction to push the release pin 7 so as to perform the shutter action sequence. At this time transfer of the switch S2 is effected so as to close the automatic current supply circuit, so that the motor M is actuated. At the time of the release action the reset switch S6 is opened, so that current supply to the relays is interrupted and the switches S7 – S10 are accordingly opened. While the motor M is in operation owing to the action of the take-up action circuit, the release lever 6 returns to the original position to close the reset switch S6, and then film take-up action is started and the aforementioned action is repeated.

When the film is exhausted and the take-up shaft 4 of the camera is accordingly stopped, the shaft 2 and the eccentric cam 5 are also stopped. If the rotation of the cam 5 up to this time has failed to close sequentially both of the take-up detection switches S4 and S5, either the switch S7 or the switch S9 is open, so that the current supply to the motor M owing to the closure of the actuating switch S1 is not accomplished. Accordingly, shutter action is not effected and the action of the mechanism is stopped. If the two take-up detection switches have been passed, release action is made once, but in the next take-up action the eccentric cam 5 does not rotate at all so that the automatic stop switches S7 and S9 remain open, current supply to the motor is stopped and the action of the arrangement is stopped.

Since the take-up detection switches S4 and S5 are not simultaneously closed, when the take-up shaft 4 is stopped with one of these switches closed, the open state of the other switch causes the mechanism to be stopped.

The above mechanism is unable to perform the film take-up action in case of trouble in the take-up and release mechanisms of the camera so that it serves as a safety device. After film reloading, the arrangement is released from the automatic stoppage state through the following process: Take-up action is performed on the side of the camera, the take-up detection switch is closed so as to complete take-up action and thereby closing automatic stop switches S7 and S9 so that the manual control current supply circuit is established. Alternatively, the automatic stop release switch S3 is temporarily closed and release action is made in the parallel circuit of the automatic stop switch.

Figure 2:
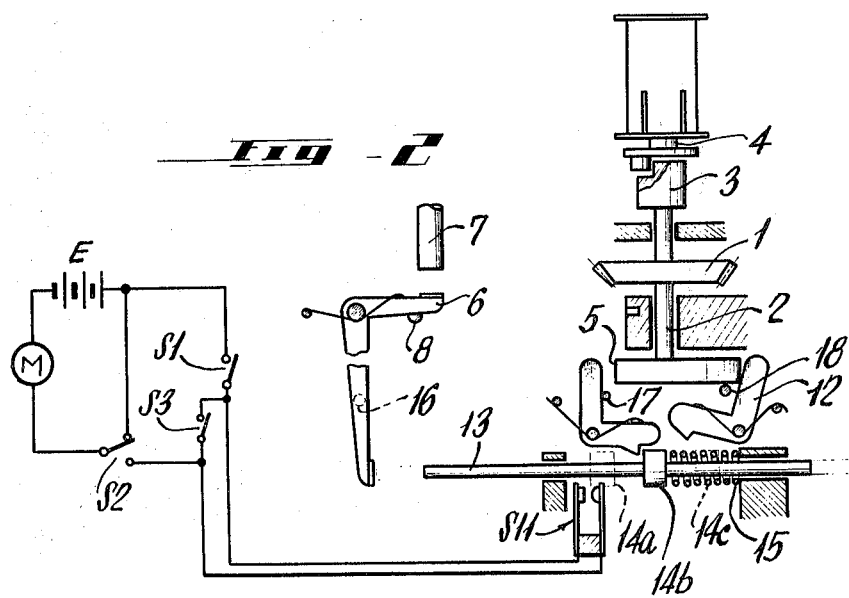
FIG. 2 is a view similar to FIG. 1 of another embodiment of the present invention.

Referring now to FIG. 2, reference numerals 1 to 8 designate the same elements as those in FIG. 1. Instead of the relays 9 and 10 of FIG. 1, there is provided a mechanism consisting of elements 11 to 18. Take-up detection levers or pawls 11 and 12 are pivoted to stationary parts of the camera casing and are spring urged clockwise and counter-clockwise, respectively. An automatic stop set shaft 13 is provided with a switch operating collar or ring 14 fixed thereto, is slideable in the axial direction, and is urged by a spring 15 to the left. A release action coupling pin 16 is provided and related as in the first embodiment. Pins 17 and 18 are provided to restrict the swinging movement of the take-up detection levers 11 and 12, respectively. As no relays are provided, the electric circuits are related only to the motor M and are the automatic current supply circuit (take-up action circuit) and the manual current supply circuit (release action circuit and include switches S1, S2 and S3.) The two automatic stoppage switches S7 and S9 of FIG. 1 are replaced by a switch S11. The other structure is the same as that of foregoing example.

The operation of the arrangement last described is similar to that first described having relays. The switch operating ring 14 is engaged by the take-up detection lever 12 at a position 14c. During take-up action, the eccentric cam 5 causes the detection lever 12 to be swung clockwise so that the ring 14 is released and moves under spring bias to a position 14b engaged by lever 11. During the subsequent take-up action the eccentric cam 5 causes the detection lever 11 to be swung counter-clockwise so that the ring 14 is disengaged, moves to a position 14a and closes the automatic stop switch S11. In the same manner as that mentioned above, the switch S2 is changed over. Release action is effected through the action of the manual current supply circuit consisting of the current source E, the actuating switch S1, the switches S11 and S2 and the motor M. The swinging movement of the release lever 6 causes the automatic stop set shaft 13 to move to the right and to be engaged by the detection lever 12. As a result, the automatic stop switch S11 is held open. At the same time, the change-over switch S2 is so operated as to establish the automatic current supply circuit. Then returning of release and film take-up action is made and the foregoing actions are repeated.

Under the condition of film exhaustion, the action is similar to that of the first embodiment. If, at the start of the take-up action the take-up detection lever 11 does not disengage the switch operating ring 14, the automatic stop switch S11 remains open so that the motor M in the manual current supply circuit is not actuated and accordingly stoppage occurs. If the take-up detection lever 11 has made disengagement already, then release action is once made. However, at the same time the automatic stop set shaft 13 is engaged by the take-up detection lever 12 so that stopping is made upon the next manual current supply circuit change-over action.

Here, disengagement by the take-up detection lever corresponds to the process that the take-up detection switch is closed, current is supplied to the relays, relay hold is effected and the automatic stop switch is caused to remain closed; and set engagement of the automatic stop set shaft corresponds to the process in which the reset switch is opened, the relays are released from the hold state, and the automatic stop switch is opened.

Figure 4:
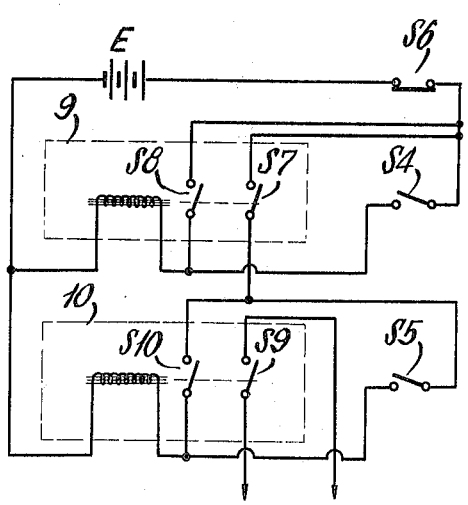
FIG. 4 is a view similar to FIG. 3 of another embodiment of the invention.
Figure 5:
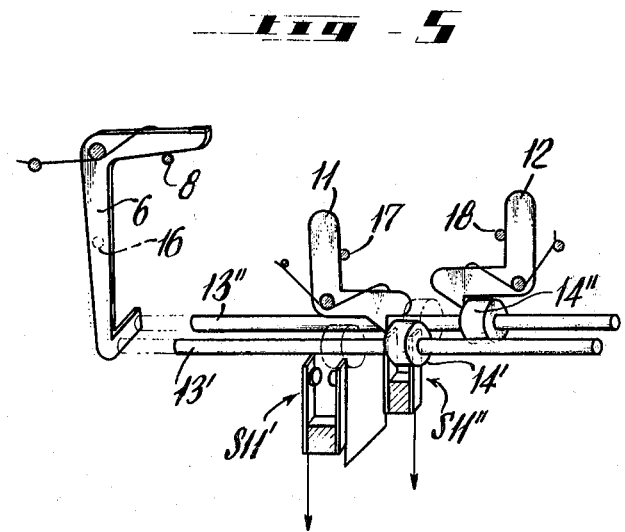
FIG. 5 is a perspective view of the mechanical components of a modification of the embodiment shown in FIG. 2.

In the above relay system two series-connected automatic stop switches are employed, while in the mechanical system only one switch is employed. In the relay system, if the order of closure of the take-up detection switches is fixed, then a single automatic stop switch may be employed as in the network shown in FIG. 4 in which the first operating take-up detection switch S4 actuates and holds the relay 9, and the resultingly closed switch S7 enables the current network to supply the relay 10. Alternatively the take-up detection switch S5 causes the realy 10 to make self-retention and the automatic stop switch S9 to be closed. Mechanically, it is possible, as shown in FIG. 5, that two parallel systems cause two automatic stop switches S11' and S11" to be serially connected together.

Further, with a relay system it is possible to provide an arrangement in which upon release action the relay is in a hold state, the take-up detection switch is of normally closed type, and such automatic stop switch is arranged so as to be opened during take-up action to release the relay and to be closed upon release action. In this case it is necessary to provide such circuit that the automatic stoppage release switch S6 is opened upon take-up action and is closed upon release action to cause the relay to self-hold. Generally, the operation is similar to that mentioned above.

The above applies also to mechanical system and it is possible to introduce such process that the take-up detection element causes the automatic stop set element to make stepwise movement, and the stepwise engagement element is released upon release action.

Figure 6:
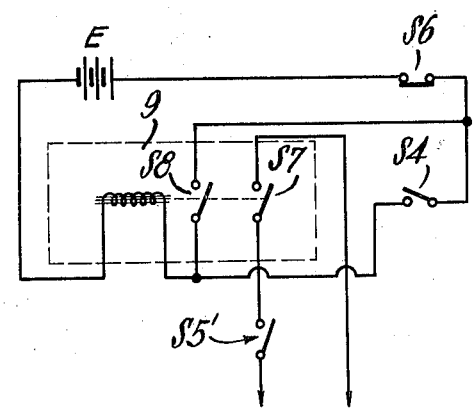
FIG. 6 is a view similar to FIG. 3 of a further embodiment of the present invention.

As explained above, both the relay system and the mechanical system can attain the present objects. With a single automatic stop switch, both of the embodiments as shown in FIG. 2 and 5 require a predetermined order to of the take-up detection elements. It is also possible to introduce such arrangement that a single take-up detection element and two projections, etc. for operating the detection element are employed, and two-stage action and return action are made by means of well-known stepwise movement mechanism employing a ratchet. Similar results can be obtained by such an arrangement that, in the relay circuit as shown in FIG. 6, one of the take-up detection swtiches S5' is positioned near the take-up completion point, and through the fact that upon completion of take-up action the take-up detection switch S5' remains closed, one relay is omitted and employment is made of the automatic stop switch of the relay.

Further, a similar result is obtained by detecting completion of take-up action by means of an element which is in driving connection with the take-up shaft, such as the shutter charge lever. The above is possible with the mechanical system.

There are take-up means in which automatic stopping is accomplished by detecting some abnormal condition other than stopping of the take-up shaft and an automatic stop switch is provided for stopping the current supply for film take-up action and preparatory action for take-up action. It is possible to add to such take-up means one-half of the take-up detection means according to the present invention, that is, a means for detecting passage of one point, so as to make automatic stoppage complete. As one such example, the camera is such that when the release button is depressed again immediately after the release return action after completion of the take-up action and shutter release action, the extent of the movement of the release button does not change from that of the moment of the release action. The take-up means is such that detection is made of abnormal operation or stoppage other than take-up action of the take-up means and the camera and current supply for take-up action or preparatory action for take-up action is stopped. If the film is exhausted immediately after completion of the take-up action and after the release action take-up action is to be started, in order to know whether the arrangement is in a state in which normal take-up action can be performed or in the state of film exhaustion, it is necessary to detect one of the following three: that the preceding shutter action has been made; that variation of the period of action owing to omission of take-up action; and that the preceding take-up action has been made. Detection of shutter action requries detection of shutter movement so that a complicated operation is necessary. Also, detection of variation of the period of action requires a complicated operation. Accordingly, complete automatic stoppage owing to detection of conditions other than take-up action can be only carried out with take-up detecting means.

One example is as follows: There is a well-known means which carries out automatic stoppage in response to variation of the extent of movement of the release button. If this automatic stoppage means is associated with a camera in which the shutter release is engaged on the way of take-up action but during the time from completion to start of take-up action, in spite of shutter action, the extent of movement does not vary, then automatic stoppage is not accomplished when the film is exhausted at the take-up completion point. Accordingly, there is provided an automatic stop means which detects passage of one point during the take-up action which is other than the take-up completion point, with the take-up detecting means based on a relay or mechanical system according to the present invention. If film exhaustion occurs during the time from the start to detection point of take-up action, stoppage is made at the time when change-over is made to the next release preparation action; if film exhaustion occurs during the time from the take-up detection point to immediately before take-up completion, stoppage is effected upon the next release action; and if film exhaustion occurs upon take-up completion, then release action is once made, and stoppage is made at the time when change-over is made to the next release preparation action. After reloading of film, release from automatic stoppage is carried out through the manual take-up action on the side of the camera.

The above description relates to take-up means in which the change-over to the film take-up circuit is made immediately after the release action. Similar results are obtained with those means in which change-over is made upon the release returning action or on the way of take-up preparation action through the process that at the time such change-over closure of the reset switch S6 or engagement-set of the automatic stop set shaft 13 and opening or returning of the set element is carried out before first take-up detection.

As explained above, an important feature of the present mechanism is that, through the take-up detection, automatic stoppage is effected when an abnormal condition in the stoppage of the take-up shaft occurs owing to film exhaustion, inability of shutter action and inability of take-up action, so that protection of the camera, the take-up means and the film is assured.

It is to be understood that a mechanism can be provided in which the automatic stoppage release switch S3 is in driving connection with setting of the film frame number dial or the open-close operation of the camera rear lid.

While there have been described and illustrated preferred embodiments of the present invention, it is apparent that numerous alterations, omissions and additions may be made without departing from the spirit thereof.

I claim:

1. A safety mechanism in an electric motor driven camera for stoppage of release action in the absence of the advance of a full frame of film, said safety mechanism comprising
   1. a first means for film take-up and shutter charge,
   2. a second means for shutter release,
   3. a release circuit including an electric motor for driving said shutter release means, a current source for said motor, a selectively operable first switch for shutter release and an automatic stop switch connected in series with said first switch and which upon completion of the take-up action stops the current supply for the film take-up action and preparatory action for the take-up action, and
   4. a take-up circuit including said current source and said motor for driving said first means, and a second switch which is opened through the first means by an increase in the film winding force closed in driving connection with said second means and stopping said motor when the film is exhausted.

2. The safety mechanism of claim 1 including a third switch arranged in parallel with said automatic stop switch, the shutter being releasable by selectively closing said third switch independently of the condition of automatic stoppage.

3. The safety mechanism of claim 1, including means for three-position stepwise movement, said means being in operative connection with the film take-up means for respective passages at two different points during one cycle of take-up action and in operative connection with the shutter release means for returning from the first position to the third position, and an automatic stop switch that is opened when said means for three-position stepwise movement is in the third position and is closed when said means for stepwise movement is in the first or second position.

4. The safety mechanism of claim 1, wherein two automatic stop switches are arranged in series and in operative connection with the film take-up means, said two switches being closed respectively at two different points during one cycle of film advance and being opened by the shutter release means when the film winding force is increased with the one switch in the closed condition.

5. The safety mechanism of claim 4, wherein said two automatic stop switches are two relay switches each of which has a pair of switches of normally open type, one switch of each pair being arranged in series with another in the shutter-release circuit, the other switch of each pair constituting a circuit for self retention of each relay switch, two switches of normally closed type which are arranged to have operative connection with the shutter release means for releasing the self-retention of the relay switches, and two switches of normally open type which are temporarily closed at two different points during one cycle of take-up action are arranged so as to energize said two relay switches respectively in driving connection with the film take-up means.

6. The safety mechanism of claim 4, including two relay switches each of which has a pair of switches of normally open type comprising said two automatic stop switches, the first relay is energized by the first normally open switch which is temporarily closed at the first point during a cycle of take-up action in operative connection with the film take-up means, the normally open switches in the first relay is for self-retention of the first relay, the other switch in the first relay forms an open-close switch for supplying the second relay with electric current, a second normally open switch which is temporarily closed at the second point during a cycle of film take-up action where the film passes after passing the first point is connected in series to the switch of the first relay for supplying the second relay with electric current, the second relay is energized upon closing the second normally open switch while the first relay is kept energized, one of the switches in the second relay is arranged for self-retention of the second relay, the other switch in the second relay is arranged within the shutter release circuit, and a normally open switch is arranged in the first relay circuit to release self-retention of the first relay in operative connection with the shutter release means, whereby the supply of current to the second relay is also stopped and the self-retention of the second relay is released as 7. In a camera including a shutter, a shutter release, a film take-up, and an electric motor for driving said shutter release and film take-up and for charging said shutter, a motor control mechanism comprising a current source, a selectively operable first switch, circuit means including second switch means closed in response to said take-up advancing past a pair of predetermined points and connected in series with said motor and first switch across said current source and means for opening said circuit means in response to the actuation of said shutter release, whereby the connection of said motor across said current source to actuate said shutter release by actuation of said first switch is enabled by the advancement of said film take-up a predetermined amount.

8. An automatic stoppage means in an electric-automatic film taking-up camera in which owing to stoppage of the take-up shaft change-over is made from a take-up circuit to a release circuit comprising a take-up and release drive motor, a current source, a shutter release control circuit including switch means connected between said motor and current source and means responsive to the advance of the film take-up through a pair of predetermined successive positions during one cycle of take-up action for closing said switch means and responsive to the change-over from the shutter release control circuit to the take-up action circuit for opening said switch, the current supply to the motor being stopped owing to opening of said switch because of the stoppage of take-up action.

* * * * *